United States Patent Office

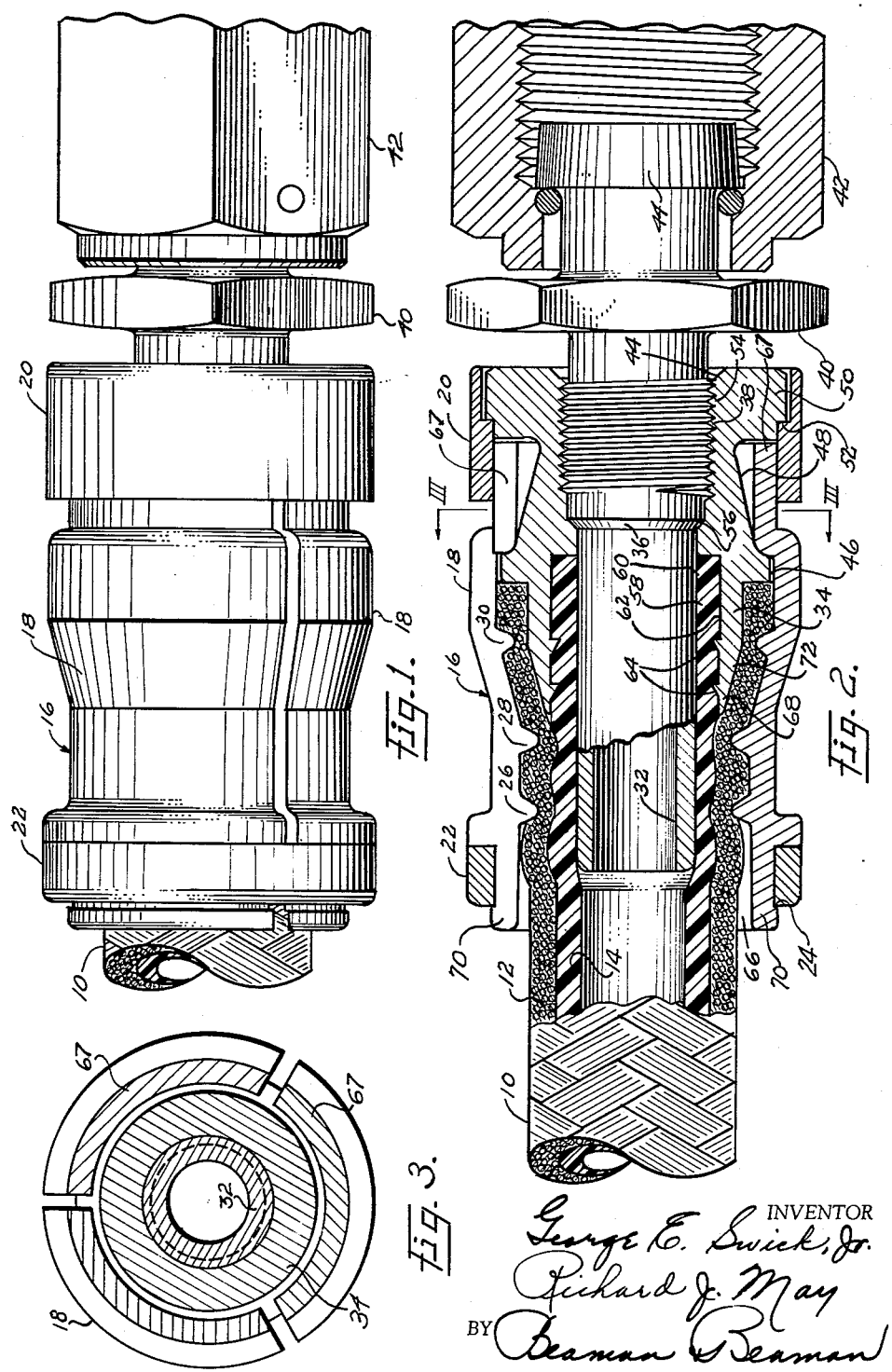

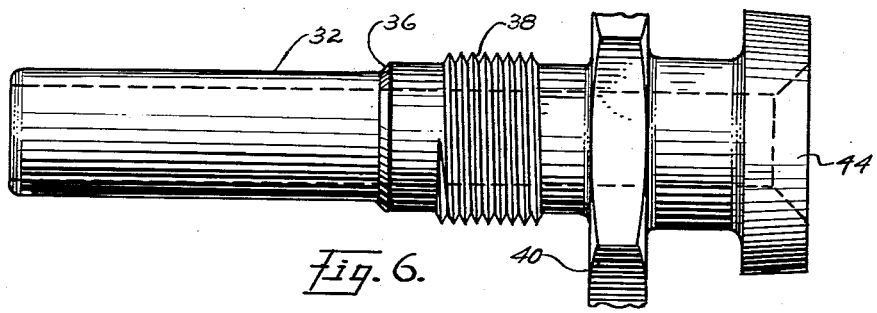
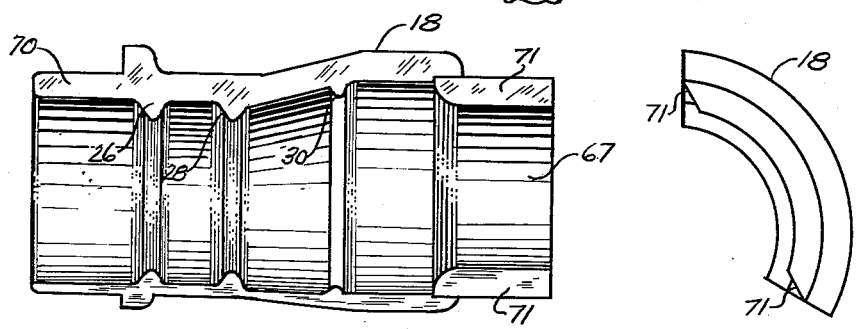
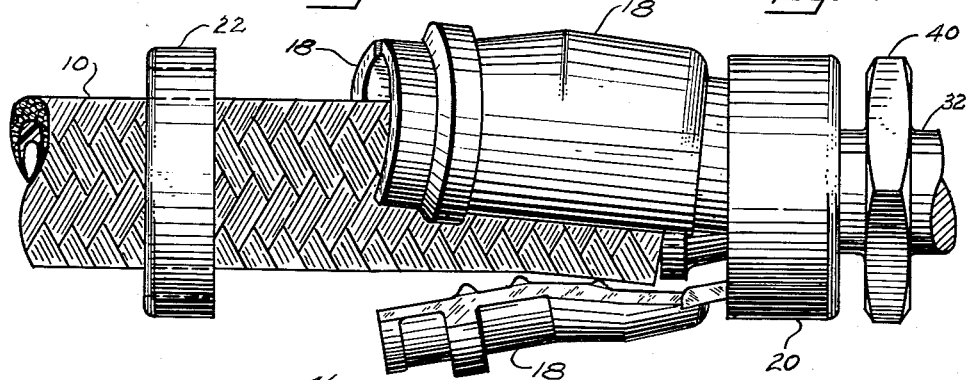
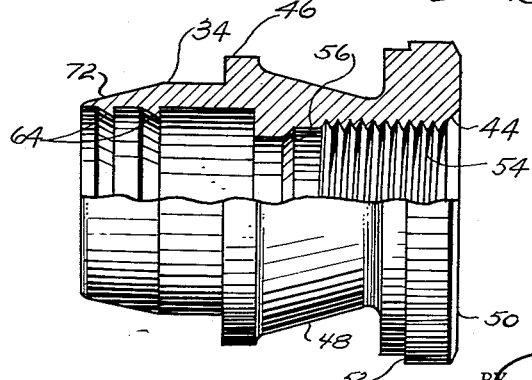

3,117,808
Patented Jan. 14, 1964

3,117,808
SEGMENTED FITTING
George E. Swick, Jr. and Richard J. May, Jackson, Mich., assignors to Aeroquip Corporation, Jackson, Mich., a corporation of Michigan
Filed Dec. 29, 1958, Ser. No. 783,550
1 Claim. (Cl. 285—149)

The present invention relates to improvements in detachable, reuseable end fittings for flexible hose lines and method of assembling the same, being particularly concerned with the provision of a satisfactory fitting for extreme high operating pressures on hose of relatively small internal diameter as well as for low and medium pressure hose of medium to large internal diameter.

At the present time there is need for an end fitting capable of being safely used upon flexible hose lines of internal diameters under one inch for handling high pressure air, helium, nitrogen and other gases for missile charging. Hose for such use must be designed for 6000 p.s.i. service with a factor of safety of 4 to 1. As a result the end fittings, in order to proof test the hose must be leakproof and "blow off" proof at 24,000 p.s.i., the burst pressure of the hose. It will be appreciated that as the internal diameter of the hose is increased that the forces acting to "blow off" the end fittings likewise increase.

While the present invention resulted from the necessity of obtaining a satisfactory fitting at operating pressures in the range of 3000 to 6000 p.s.i. with hose having burst pressures in the range of 12,000 to 24,000 p.s.i., it has been found that the principles of the design have equal application in low and medium pressure hose and particularly in the larger sizes, as for example, in hose having internal diameter in the order of 3 to 5 inches.

It should further be noted that while the present invention was primarily concerned with the problem presented by hose having multiple plies of wire reinforcement on the outer surface (braided, spiral wrapped or a combination thereof) giving support to an inner sealing tube of polymerized tetrafluoroethylene and other inner tube stock of low compression set characteristics, it has equal application to single braided or spiral wrapped hose as well as to hose of rubber, both natural and synthetic.

In structural and functional design, the principle of the present invention has particular application in combination with pressure actuated lip seals which may take many forms. Reference may be had to United States Patents Nos. 2,731,279 and 2,833,567 as disclosing two different forms of lip sealing in end fittings. The invention has been illustrated in connection with the type of lip seal disclosed in Patent No. 2,833,567.

In the development of a satisfactory high pressure fitting having a pressure actuated lip seal for a hose having an inner sealing tube of low resistance to compression set, it is necessary that the forces tending to "blow off" the hose from the fitting be resisted by the grip or anchorage between the fitting and the reinforcing layers of the hose. Heretofore, it has been the practice to increase the compressive forces developed between the fitting and hose to obtain the necessary resistance to "blow off" or to increase the degree of anchorage between the wire reinforcement and the fitting by extreme deflection or warping of the wires or by clamping.

Where the compressive forces on the outer reinforcement of the hose are developed by relative axial movement between the end fitting components, the amount of applied torque required in the assembly of the detachable, reuseable fitting becomes extremely great, in order to prevent "blow off" at extremely high operative pressure or with large size hose, and presents a serious problem. The problem is even more serious in detachable, reuseable fittings of the lip seal type in which the sealing lip defined by an inner layer of the hose is to be protected from substantial forces of compression developed during assembly.

It has long been recognized that it would be advantageous to be able to rotate the nipple assembly of an end fitting relative to the remaining components of the fitting without detrimental results. Such rotation, if readily accomplished, avoids twisted hose, facilitates alignment of elbow fittings and makes possible the use of male threaded connections at both ends of the hose line. An unexpected result of the present invention was the provision of a hose line assembly possessing such a characteristic, particularly in connection with hose having an inner sealing tube of low resistance to compression set stock.

According to the present invention, the anchorage between the wire reinforcement of the hose and the fitting components is accomplished in a detachable, reuseable end fitting for flexible hose by deformation of the wire resulting from radially applied forces. Such forces are presented through the medium of annular ribs projecting inwardly from the interior surface of a segmented socket which upon assembly is radially contracted. Preferably the socket is longitudinally split and in the illustrated form the resulting segments of the socket are hinged about one end as levers to deform and set the reinforcing wire of the hose. However, it is to be understood that the rate of contraction of the segments upon the wire reinforcement may be uniform or varied from end to end of the segments.

In practice, the clearance between the interior surface (between adjacent ribs) of the segments of the socket and the outer wire reinforcing of the hose is such that compressive forces of assembly are substantially confined to radial planes through the ribs. With the inner nipple of the nipple assembly supporting the inner sealing tube, the resistance offered by the tube is sufficient to deform and set the wire in the plane of the ribs. When the inner sealing tube is of polymerized tetrafluoroethylene or other similar low resistance to compression set stock, after the initial resistance to compression which is adequate to deform and set the wire, force of compression applied to the inner sealing tube will be dissipated by "flow" to relieve the compression upon the nipple assembly and permitting the nipple assembly to be readily rotated in the fitting relative to the remaining components.

Thus, an object of the invention is to provide an improved detachable, reuseable segmented end fitting.

Another object is to provide an improved end fitting having a segmented socket and a nipple assembly defining a lip seal structure.

Another object is to provide an improved end fitting in which the wire reinforcement of the hose is anchored to the fitting components by radial forces to deform and set the reinforcing wire and then thereafter resist axial displacement in a "blow off" direction.

A further object is to provide a lip seal end fitting in which the forces of assembly deform and set the reinforcing wire and establish an initial compression upon the inner seal tube and nipple assembly in the course of such deformation. Thereafter such compression is substantially dissipated whereby the nipple assembly may be readily rotated relative to the remaining components of the end fitting.

A still further object of the invention is to provide a nipple assembly for a lip seal end fitting in which the outer nipple of the assembly is supported by the socket through the wire reinforcement.

Another object is to provide an improved end fitting in which the nipple assembly includes a wrench flange and the socket is segmented and has a fulcrum ring which supports the socket and embraces the wrench flange to establish the sequence of assembly and obviate unintentional manipulation of the nipple assembly.

Another object is to provide a nipple assembly for a lip seal end fitting in which there is a stressed threaded connection between the nipple parts developed at the time the metal-to-metal seal is established between the nipple parts.

Another object is to provide a method of assembly of a lip seal fitting to provide a swivel nipple structure.

These and other objects and advantages have been set forth in the full specification and claim and they will be fully appreciated from a consideration thereof.

In the drawings,

FIG. 1 is a side elevation of a hose and end fitting assembly embodying the present invention, FIG. 2 is a vertical cross sectional view of FIG. 2, FIG. 3 is a cross sectional view taken on line III—III of FIG. 1, FIG. 4 is a view similar to FIG. 1 before the segments of the socket structure are contracted, FIG. 5 is a side elevational view of the outer nipple partially shown in cross section, FIG. 6 is a side elevational view of the inner nipple, and FIGS. 7 and 8 are side and end views, respectively, of the socket segment.

Referring to the illustrated form of the invention, the hose 10 has an outer wire reinforcing cover 12 which is shown of multiple ply wire braid or spiral wire wrap, or a combination of braid and spiral wrap. The inner seal tube 14, in the preferred form of the invention, is unbonded to the cover 12, being fabricated from a material of low compression set such as polymerized tetrafluoroethylene, polyethylene, and the like. It will be understood, however, that the inner sealing tube may be bonded to the cover 12 and separated therefrom at or prior to assembly and the inner sealing tube may be of material having good compression recovery such as natural and synthetic rubber. In general, the material of the inner sealing tube will depend upon the service in which the hose line assembly is to be employed and whether the swivel features of the nipple structure is required.

The socket structure 16 comprises three similar segments 18 held in their radially contracted position by end rings 20 and 22. A slight shoulder 24 prevents unintentional displacement of the ring 22. Each segment 18 has a series of radially inward projections on its interior surface to collectively define annular ribs 26, 28 and 30. These ribs, upon radial contraction of the segment 18, deform and set the wire in the manner shown in FIG. 2.

Similar in function to the lip seal structure of United States Patent No. 2,833,567, the nipple structure comprises an inner nipple 32 and an outer nipple 34. The nipple 32 has a seat at 36, threads at 38, a flange 40 having wrench flats, and a swiveled nut 42 for establishing a connection with the terminal seat 44.

The outer nipple 34 has an abutment 46, conical portion 48 to permit insertion and pivotal movement of the segments 18 within the ring 20, a flange 50 having wrench flats, and a shoulder 52 to limit the movement of the ring 20 in one direction. In the position shown in FIG. 2, the ring 20 is concealing the flange and obviating any possibilty of a wrench being inadvertently applied to the flange 50. Threads 54 on the nipple 34 engage with the threads 38 of the nipple 32 to bring the seat 36 into sealing engagement with the seat 56 to provide a metal-to-metal seal directly adjacent the recess 58 in which the lip seal portion 60 of the inner sealing tube is located. It will be noted that the threads 38 and 54 will always be stressed with the seats 36 and 56 in stressed engagement.

As shown, the inner cylindrical surface 62 of the nipple 34 which is spaced from the nipple 32 to form the recess 58 has annular ribs 64 which function to assure pressure actuation of the lip seal portion 60, as more fully disclosed in United States Patent No. 2,833,567.

Referring to FIG. 2, with the segments 18 held against outward displacement by the rings 20 and 22, the wire reinforcement 12 has clearance at 66 with the interior surface of the segments 18 except between the ribs 28 and 30. To support the tapered leading end or nose 68 of the nipple 34 against distortion by the fluid pressure confined by the hose 10, the interior wall 70 between the ribs 28 and 30 is spaced from the tapered outer surface 72 of the nipple 34 a distance approximating the thickness of the cover 12. Elsewhere along the interior surface of the segments 18 it has been found desirable to provide clearance with the cover 12 (except at the ribs 26, 28 and 30) as it is the deformation of the wire cover 12 at the ribs which is being relied upon to resist "blow off" rather than the development of compressive forces upon the cover 12.

When the inner sealing tube 14 is fabricated from a material having a low compressive set, the extension of the nipple 32 axially beyond the nipple 34 gives interior support to the inner sealing tube 14 to provide the necessary resistance to deform the wire cover 12 in the radial plane of the ribs 26 and 28. Thereafter the "flowing" characteristic and the low compression set of the material of the inner sealing tube 14 will materially relieve any compression developed between the nipple 32 and tube 14. Thus, it becomes relatively easy to rotate the nipples 32 and 34 as a unit relative to the socket 16 and hose 10 as there is only a moderate amount of grip or compression between the outer surface of the nipple 34 and the wire cover 12 imposed thereon. As the lip seal portion 60 is substantially free from compression in the recess 58, relative rotation between the nipple structure and the inner sealing tube 14 will not be detrimental to the lip seal portion 60 and it retains its effective sealing characteristics in all positions of relative rotation.

The means employed to contract the segment 18 upon the cover 12 forms no part of tht present invention. In the illustration of the invention the segments 18 are intended to be pivoted about the ends 67 which engage the inside of the ring 20 as a fulcrum. The conical portion 48 of the nipple 34 permits the segments 18 to swing outwardly as indicated in FIG. 4 to receive the end of the hose 10 slightly expanded by the insertion of the nipples 32 and 34. Radial movement of the ends 70 toward their position of FIG. 1 will bring the abutment 72 into sliding engagement back of the abutment 46 and the ring 22 is applied to retain the segments 18 in their fully contracted position.

In the assembly of the hose and fitting of FIG. 1, the rings 22 and 20 are loosely applied over the hose end. If necessary the nipple 32 may be temporarily inserted into the bore of the inner seal tube 14 to open up the braid or wrap of the cover 12. Nipple 32 is then removed and the nipple 34 is inserted between the cover 12 and the outer surface of the tube 14 to fully embrace the lip seal portion 60. The nipple is then inserted into the bore of the tube 14 and rotated relative to the nipple 32 to advance the seat 36 into stressed engagement with the seat 56 to form the metal-to-metal seal between the nipples 32 and 34.

With the nipples 32 and 34 in position, the ring 20 is moved from the hose into the position shown in FIG. 1 to conceal the flange 50. The ends 67 of the segments 18 are then inserted within the ring 20. As shown in FIGS. 7 and 8, this insertion is assisted by beveling the edges 71 of the ends 67. The ends 70 of the segments are then rocked radially inward in any suitable manner to progressively bring the ribs 30, 28, and 26 into engagement with the cover 12 to deform the reinforcing wires thereof. The assembly is completed by the placement of the ring 22.

We claim:

A lip seal dye detachable, reuseable fitting for flexible hose having an outer reinforcement and an inner sealing tube comprising concentric inner and outer nipples having spaced coaxial portions to define an annular lip seal recess for the inner sealing tube of the hose, a socket mounted upon said outer nipple in spaced coaxial relation with said outer nipple along a portion of their coaxial length to define an annular recess in which the outer reinforcement of the hose may be received, complementary abutting annular sealing seats upon said inner and outer nipples, and a threaded connection between said nipples for aligning said seats in stressed abutting relation to form a seal, said socket being longitudinally split to provide segments, ribs upon the interior surfaces of said segments to deform the reinforcement of the hose, means for supporting said segments radially contracted upon said outer nipple, said last means including a ring giving support to said segments at one end of said socket, a wrench flange on said outer nipple, said ring being axially slidable relative to said outer nipple to embrace said wrench flange while retaining radially overlapping relationship with said segments.

References Cited in the file of this patent
UNITED STATES PATENTS

| | | |
|---|---|---|
| 409,066 | Ravenel | Aug. 13, 1889 |
| 1,876,639 | Disler et al. | Sept. 13, 1932 |
| 2,463,293 | Mentel | Mar. 1, 1949 |
| 2,731,279 | Main | Jan. 17, 1956 |
| 2,809,056 | Kaiser | Oct. 8, 1957 |
| 2,833,567 | Bacher | May 6, 1958 |
| 2,958,549 | Spafford | Nov. 1, 1960 |
| 3,019,038 | Cline et al. | Jan. 30, 1962 |